(12) United States Patent
Aso et al.

(10) Patent No.: US 12,556,086 B2
(45) Date of Patent: Feb. 17, 2026

(54) POWER SUPPLY APPARATUS WITH INRUSH CURRENT PREVENTION CIRCUIT AND BOOST CONVERTER CIRCUIT

(71) Applicant: Yokogawa Electric Corporation, Tokyo (JP)

(72) Inventors: Naoya Aso, Musashino (JP); Kei Fukuhara, Musashino (JP); Masahiko Suzuki, Musashino (JP); Iwao Nakanishi, Musashino (JP)

(73) Assignee: Yokogawa Electric Corporation, Tokyo (KR)

( * ) Notice: Subject to any disclaimer, the term of this patent is extended or adjusted under 35 U.S.C. 154(b) by 291 days.

(21) Appl. No.: 18/108,960

(22) Filed: Feb. 13, 2023

(65) Prior Publication Data

US 2023/0318443 A1 Oct. 5, 2023

(30) Foreign Application Priority Data

Mar. 29, 2022 (JP) ................................ 2022-054646

(51) Int. Cl.
*H02M 3/158* (2006.01)
*H02M 1/36* (2007.01)
*H02M 1/32* (2007.01)

(52) U.S. Cl.
CPC ............. *H02M 3/158* (2013.01); *H02M 1/36* (2013.01); *H02M 3/1582* (2013.01); *H02M 1/32* (2013.01)

(58) Field of Classification Search
CPC .... H02M 3/156; H02M 3/158; H02M 3/1582; H02M 1/007; H02M 1/0009; H02M 1/32;
(Continued)

(56) References Cited

U.S. PATENT DOCUMENTS 6,365,868 B1 * 4/2002 Borowy ............... B23K 10/006
219/121.57
9,722,485 B2 8/2017 Mikami et al.
(Continued)

FOREIGN PATENT DOCUMENTS

JP 2017-183069 A 10/2017
JP 2018-29415 A 2/2018
(Continued)

OTHER PUBLICATIONS

1 European Office Action (EPOA) dated Aug. 19, 2024 for European Application No. 23157210.8.
(Continued)

*Primary Examiner* — Gustavo A Rosario-Benitez
(74) *Attorney, Agent, or Firm* — RANKIN, HILL & CLARK LLP

(57) ABSTRACT

A power supply apparatus (100) according to the present disclosure converts an input voltage supplied from a power source to a predetermined direct current voltage. The power supply apparatus (100) includes an inrush current prevention circuit (120) based on a buck converter system and configured to suppress a flow of inrush current from the power source to the power supply apparatus (100) and a boost converter circuit (130) configured to output the predetermined direct current voltage. A choke coil (104) included in the inrush current prevention circuit (120) and a choke coil (104) included in the boost converter circuit (130) are a common choke coil. A smoothing capacitor (107) included in the inrush current prevention circuit (120) and a smoothing capacitor (107) included in the boost converter circuit (130) are a common smoothing capacitor.

3 Claims, 10 Drawing Sheets

(58) Field of Classification Search
CPC ......... H02M 1/36; H02H 9/001; H02H 9/002; H02H 9/02; H02H 9/025
See application file for complete search history.

(56) References Cited

U.S. PATENT DOCUMENTS

| | | | |
|---|---|---|---|
| 10,578,654 B2 | 3/2020 | Zhou et al. | |
| 2007/0230220 A1* | 10/2007 | Chan | H02M 1/36 363/16 |
| 2014/0239919 A1* | 8/2014 | Bernardon | H02M 3/156 320/166 |
| 2015/0123629 A1* | 5/2015 | Ohshima | H02M 1/32 323/271 |
| 2016/0344292 A1* | 11/2016 | Sonnaillon | H02M 1/32 |
| 2021/0296981 A1 | 9/2021 | Neudorf et al. | |
| 2022/0077783 A1* | 3/2022 | Khamesra | H02M 1/0019 |

FOREIGN PATENT DOCUMENTS

| | | | | |
|---|---|---|---|---|
| JP | 2020178503 A | | 10/2020 | |
| KR | 20170050014 | * | 5/2017 | .............. H02M 1/15 |

OTHER PUBLICATIONS

Japanese Office Action dated May 7, 2024 for Japanese Patent Application No. 2022-054646; English translation.

* cited by examiner

POWER SUPPLY APPARATUS WITH INRUSH CURRENT PREVENTION CIRCUIT AND BOOST CONVERTER CIRCUIT

CROSS-REFERENCE TO RELATED APPLICATION

The present application claims priority to Japanese Patent Application No. 2022-054646 filed on Mar. 29, 2022, the entire contents of which are incorporated herein by reference.

TECHNICAL FIELD

The present disclosure relates to a power supply apparatus.

BACKGROUND

Power supply apparatuses that include an inrush current prevention circuit to suppress inrush current when the power is turned on are known. For example, see Patent Literature (PTL) 1 and 2.

In a case in which a power supply apparatus supplies voltage to a converter such as a DC-DC converter, a DC voltage suitable for operation of the converter is preferably supplied. If the power supply apparatus includes a boost converter circuit, the power supply apparatus can output a DC voltage boosted to the desired voltage, thus providing a DC voltage suitable for operation of the converter.

The power supply apparatus is thus preferably provided with an inrush current prevention circuit and a boost converter circuit.

CITATION LIST

Patent Literature

PTL 1: JP 2017-183069 A
PTL 2: JP 2018-29415 A

SUMMARY

A power supply apparatus according to several embodiments is a power supply apparatus for converting an input voltage supplied from a power source to a predetermined direct current voltage, the power supply apparatus including an inrush current prevention circuit based on a buck converter system and configured to suppress a flow of inrush current from the power source to the power supply apparatus; and a boost converter circuit configured to output the predetermined direct current voltage, wherein a choke coil included in the inrush current prevention circuit and a choke coil included in the boost converter circuit are a common choke coil, and a smoothing capacitor included in the inrush current prevention circuit and a smoothing capacitor included in the boost converter circuit are a common smoothing capacitor.

DETAILED DESCRIPTION

Figure 1:
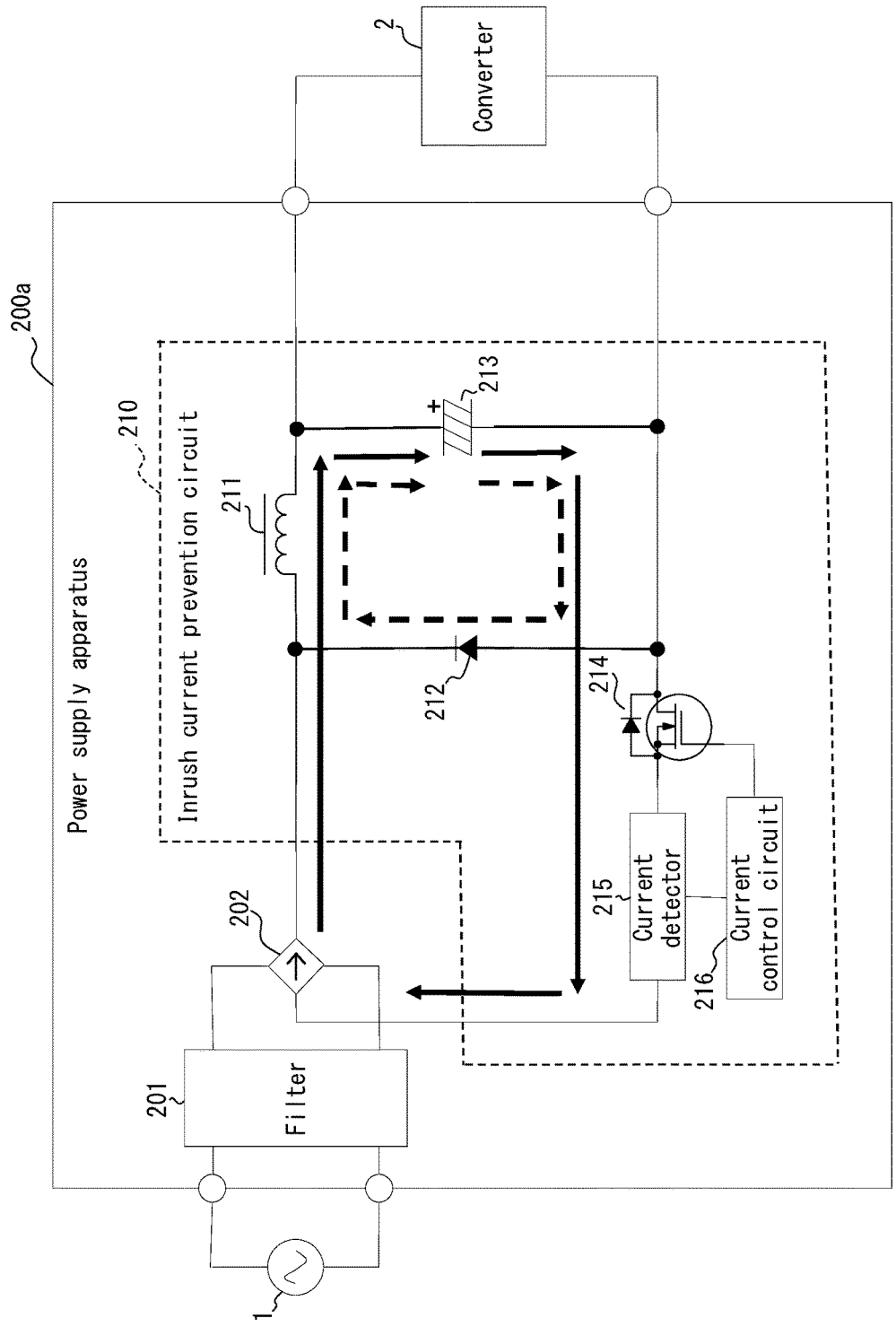
FIG. 1 is a diagram illustrating a schematic configuration of a known inrush current prevention circuit.

Power supply apparatuses with an inrush current prevention circuit and a boost converter circuit have room for improvement in the cost of circuit elements.

It would be helpful to provide a power supply apparatus that can reduce the cost of circuit elements while including an inrush current prevention circuit and a boost converter circuit.

A power supply apparatus according to several embodiments is a power supply apparatus for converting an input voltage supplied from a power source to a predetermined direct current voltage, the power supply apparatus including an inrush current prevention circuit based on a buck converter system and configured to suppress a flow of inrush current from the power source to the power supply apparatus; and a boost converter circuit configured to output the predetermined direct current voltage, wherein a choke coil included in the inrush current prevention circuit and a choke coil included in the boost converter circuit are a common choke coil, and a smoothing capacitor included in the inrush current prevention circuit and a smoothing capacitor included in the boost converter circuit are a common smoothing capacitor. Such a power supply apparatus can reduce the cost of circuit elements while including an inrush current prevention circuit and a boost converter circuit.

The power supply apparatus according to an embodiment may further include a mode control circuit configured to switch between a first mode and a second mode, the first mode may be a mode in which the inrush current prevention circuit performs an inrush current prevention operation and the boost converter circuit does not perform a boost converter operation, and the second mode may be a mode in which the inrush current prevention circuit does not perform an inrush current prevention operation and the boost converter circuit performs a boost converter operation. By thus switching between the first mode and the second mode, the power supply apparatus can operate as either an inrush current prevention circuit or a boost converter circuit.

In a power supply apparatus according to an embodiment, the inrush current prevention circuit may further include a first FET capable of switching between applying and not applying current from the power source to the inrush current prevention circuit, the power supply apparatus may further include a voltage detector capable of detecting a voltage value between a drain and a source of the first FET, and the mode control circuit may be configured to switch from the first mode to the second mode when the voltage value between the drain and the source of the first FET detected by the voltage detector falls to a predetermined threshold or less. By this switching from the first mode to the second mode when the voltage value between the drain and the source of the first FET falls to a predetermined threshold or less, it is possible to transition from operation as an inrush current prevention circuit to operation as a boost converter circuit at an appropriate timing.

In a power supply apparatus according to an embodiment, the boost converter circuit may further include a second FET capable of adjusting an output voltage of the boost converter circuit by an on/off duty ratio, and the mode control circuit may be configured to control the second FET to be always off in the first mode, and control the first FET to be always on in the second mode. Such control enables appropriate switching between the first mode and the second mode.

A power supply apparatus according to an embodiment may further include a damping circuit upstream from the inrush current prevention circuit. By a damping circuit thus being provided, LC resonance can be suppressed.

According to the present disclosure, a power supply apparatus that can reduce the cost of circuit elements while including an inrush current prevention circuit and a boost converter circuit can be provided.

(Inrush Current Prevention Circuit)

First, a conventional inrush current prevention circuit is described.

There are several systems used in inrush current prevention circuits. For example, inrush current prevention circuits use the following systems.

parallel connection system between a triac and a thermal fuse resistor
 power thermistor system
 parallel connection system between a field effect transistor (FET) and a thermal fuse resistor
 buck converter system Each system for an inrush current prevention circuit is now described.

<Parallel Connection System Between a Triac and a Thermal Fuse Resistor>

In this configuration, a circuit with a triac and a thermal fuse resistor connected in parallel is disposed at the input portion where voltage is applied from the power source.

When the power is turned on, the triac is controlled to be off, and current flows through the thermal fuse resistor. At this time, the inrush current is suppressed by the resistance value of the thermal fuse resistor. The thermal fuse resistor melts when a current exceeding a predetermined value flows through it, thus preventing the power supply apparatus from failing due to a large current.

When the smoothing capacitor, which is charged by the current flowing from the power source, is fully charged, the triac is controlled to turn on. Since the resistance value of the triac is smaller than the resistance value of the thermal fuse resistor, the current flowing from the power source flows through the triac.

This system has the problem of high cost due to the large number of components. Furthermore, triacs have a large voltage drop of about 1 V when conducting, resulting in large losses in the inrush current prevention circuit under steady-state conditions.

<Power Thermistor System>

In this configuration, a power thermistor is disposed at the input portion where voltage is applied from the power source. Power thermistors are characterized by a high resistance value at low temperatures and a low resistance value at high temperatures.

The resistance value of a power thermistor is large when the power is turned on, since the temperature of the power thermistor is low. Therefore, the inrush current generated when the power is turned on can be suppressed by the large resistance value of the power thermistor. Upon reaching a steady state after some time has elapsed, the temperature of the power thermistor has risen due to self-heating. Therefore, in a steady state, the resistance value of the power thermistor is small, and the loss due to the power thermistor can be reduced.

In this system, if the power source is turned back on at an early timing after the power source is turned off, the temperature of the power thermistor remains high. The resistance value of the power thermistor therefore remains small, leading to the problem that inrush current cannot be suppressed. Furthermore, even if the temperature of the power thermistor becomes high in a steady state, the resistance value of the power thermistor is a relatively large value of about several 100 mΩ. This leads to the problem of a large loss for the inrush current prevention circuit in a steady state.

<Parallel Connection System Between a FET and a Thermal Fuse Resistor>

In this configuration, a circuit with a FET and a thermal fuse resistor connected in parallel is disposed at the input portion where voltage is applied from the power source.

When the power is turned on, the FET is controlled to be off, and current flows through the thermal fuse resistor. At this time, the inrush current is suppressed by the resistance value of the thermal fuse resistor. The thermal fuse resistor melts when a current exceeding a predetermined value flows through it, thus preventing the power supply apparatus from failing due to a large current.

When the smoothing capacitor, which is charged by the current flowing from the power source, is fully charged, the FET is controlled to turn on. Since the on resistance of the FET is smaller than the resistance value of the thermal fuse resistor, the current flowing from the power source flows through the FET.

This system has the problem of high cost due to the large number of components.

<Buck Converter System>

FIG. 1 illustrates a power supply apparatus 200a that includes an inrush current prevention circuit 210 using the buck converter system.

The power supply apparatus 200a converts the input voltage supplied from an alternating current (AC) power source 1 into a direct current (DC) voltage and outputs the DC voltage to a converter 2. The converter 2 may, for example, be a DC-DC converter.

The power supply apparatus 200a includes a filter 201, a rectifier 202, and an inrush current prevention circuit 210 based on the buck converter system.

The filter 201 removes voltage of an unwanted frequency component included in the input voltage from the AC power source 1. The filter 201 may, for example, be a low-pass filter or a band-bus filter.

The rectifier 202 is a circuit that allows current to flow in only one direction.

The inrush current prevention circuit 210 includes a choke coil 211, a diode 212, a smoothing capacitor 213, a FET 214, a current detector 215, and a current control circuit 216.

Operations of the inrush current prevention circuit 210, which is based on the buck converter system, are described below.

When voltage is applied from the AC power source 1, the FET 214 is controlled to turn on. When voltage is applied from the AC power source 1, current flows through the inrush current prevention circuit 210 as indicated by the solid arrows. That is, current flows in the order of the choke coil 211, the smoothing capacitor 213, the FET 214, and the current detector 215. The smoothing capacitor 213 is charged by the current flowing in this way.

The current detector 215 detects the value of current flowing in the FET 214. The current detector 215 outputs the detected value of current to the current control circuit 216.

The current control circuit 216 turns off the FET 214 when the value of current acquired from the current detector 215 reaches a predetermined value of current or higher.

When the FET 214 turns off, the magnetic energy accumulated in the choke coil 211 is released, and current flows as indicated by the dashed arrows. That is, current flows in the order of the choke coil 211, the smoothing capacitor 213, and the diode 212. The smoothing capacitor 213 is charged by the current flowing in this way.

Subsequently, the current control circuit 216 turns on the FET 214 when the value of current acquired from the current detector 215 falls below a predetermined value of current.

By thus repeatedly turning the FET 214 on and off, the inrush current prevention circuit 210 can charge the smoothing capacitor 213 while suppressing inrush current.

When the smoothing capacitor 213 is fully charged, current no longer flows through the FET 214. In this state, the current control circuit 216 controls the FET 214 to be always on.

The buck converter system is less expensive than other systems by virtue of having fewer components. Furthermore, the buck converter system is characterized by low loss. Therefore, an inrush current prevention circuit based on the buck converter system can be considered to have an advantageous configuration as compared to inrush current prevention circuits of the other systems described above.

(Boost Converter Circuit)

Next, a conventional boost converter circuit is described.

When AC voltage is inputted to a power supply apparatus, rectification using only a smoothing capacitor distorts the input current and generates harmonic currents. Efficiency deteriorates when harmonic currents are generated. Furthermore, the generation of harmonic currents can cause equipment malfunction. Harmonics therefore need to be kept at or below the values specified by the International Electrotechnical Commission (IEC).

When the power supply apparatus supplies DC voltage to the converter, a DC voltage suitable for operation of the converter is preferably supplied.

To reduce harmonics and achieve a DC voltage output suitable for operation of the converter, a power supply apparatus is generally configured to include a boost converter circuit with an active power factor correction (APFC) function.

Figure 2:
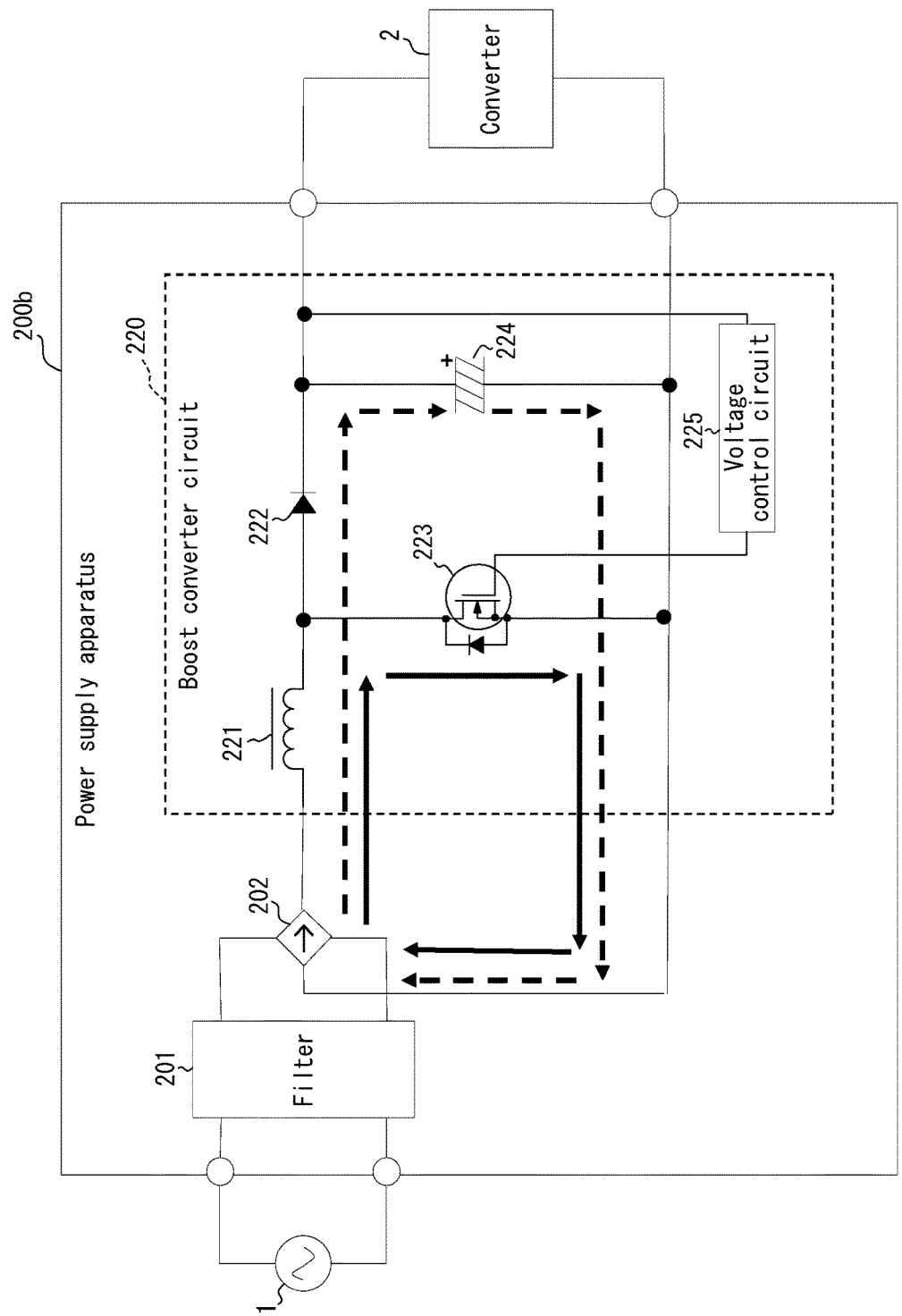
FIG. 2 is a diagram illustrating a schematic configuration of a known boost converter circuit.

FIG. 2 illustrates a power supply apparatus 200b that includes a boost converter circuit 220. The boost converter circuit 220 is a boost converter circuit with an APFC function.

The power supply apparatus 200b converts the input voltage supplied from an AC power source 1 into a DC voltage and outputs the DC voltage to a converter 2. The converter 2 may, for example, be a DC-DC converter. The power supply apparatus 200b can output a DC voltage suitable for operation of the converter 2.

The power supply apparatus 200b includes a filter 201, a rectifier 202, and a boost converter circuit 220.

The filter 201 removes voltage of an unwanted frequency component included in the input voltage from the AC power source 1. The filter 201 may, for example, be a low-pass filter or a band-bus filter.

The rectifier 202 is a circuit that allows current to flow in only one direction.

The boost converter circuit 220 includes a choke coil 221, a diode 222, a FET 223, a smoothing capacitor 224, and a voltage control circuit 225.

Operations by the boost converter circuit 220 are now described.

When the FET 223 is on, current flows through the boost converter circuit 220 as indicated by the solid arrows. That is, current flows in the order of the choke coil 221 and the FET 223. At this time, magnetic energy accumulates in the choke coil 221.

Upon the FET 223 turning off, the voltage direction is reversed in the choke coil 221, the magnetic energy accumulated in the choke coil 221 is released, and current flows as indicated by the dashed arrows. That is, current flows in the order of the choke coil 221, the diode 222, and the smoothing capacitor 224.

By thus repeatedly turning the FET 223 on and off, the boost converter circuit 220 performs the boost operation.

The voltage control circuit 225 detects the voltage value of the smoothing capacitor 224 and controls the duty ratio at which the FET 223 turns on and off so that the detected voltage value approaches a voltage suitable for the converter 2.

By the duty ratio at which the FET 223 turns on and off thus being controlled, the boost converter circuit 220 can output a predetermined DC voltage. The boost converter circuit 220 can also reduce harmonics.

Comparative Example

Figure 3:
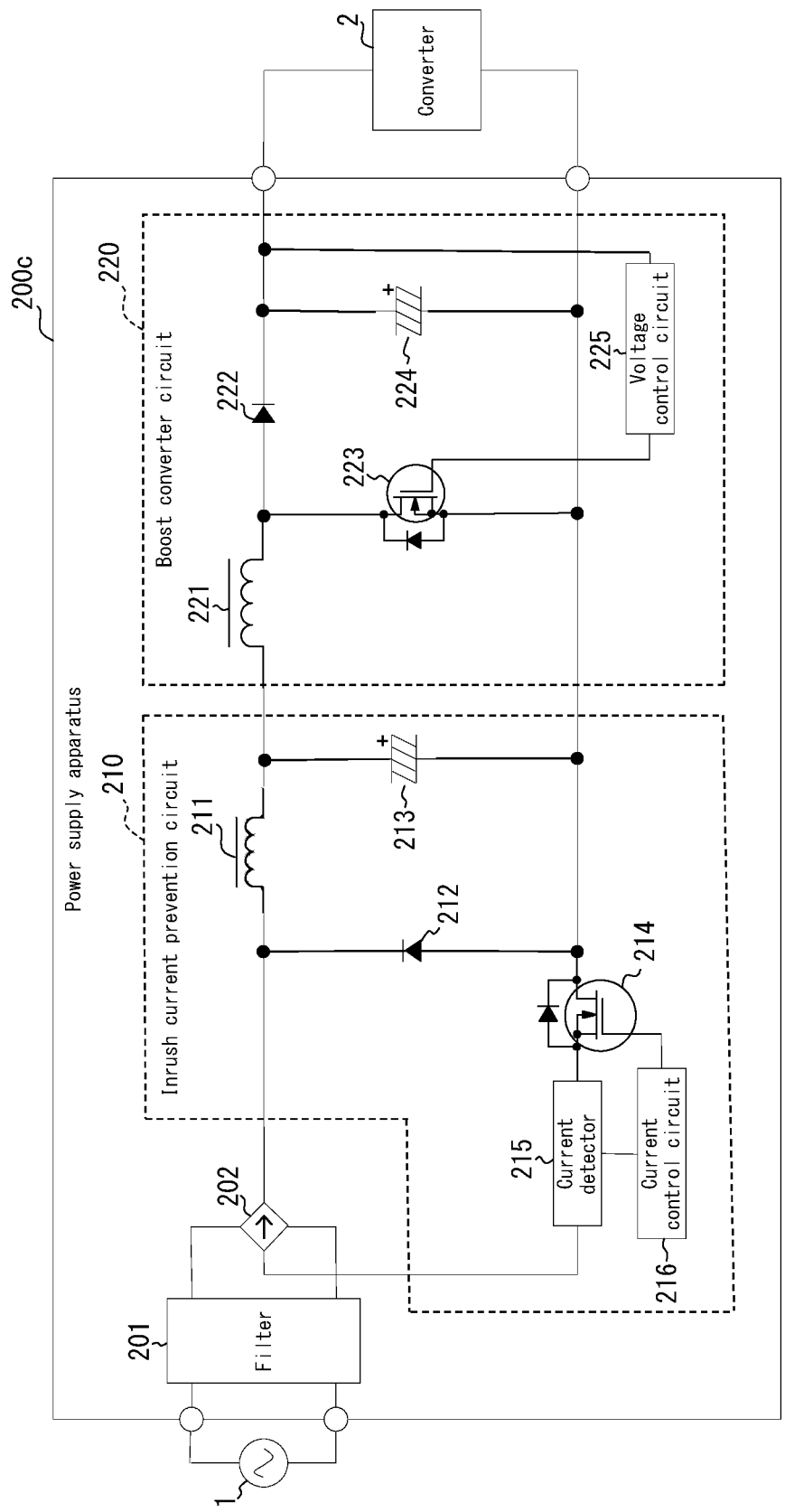
FIG. 3 is a diagram illustrating a schematic configuration of a power supply apparatus according to a comparative example.

FIG. 3 is a diagram illustrating a schematic configuration of a power supply apparatus 200c according to a comparative example.

The power supply apparatus 200c according to a comparative example includes a filter 201, a rectifier 202, the inrush current prevention circuit 210 described with reference to FIG. 1, and the boost converter circuit 220 described with reference to FIG. 2.

By thus including the inrush current prevention circuit 210 based on the buck converter system, the power supply apparatus 200c can suppress the flow of inrush current from the AC power source 1 to the power supply apparatus 200c when voltage is applied from the AC power source 1. Furthermore, the inrush current prevention circuit 210 is based on the buck converter system and is therefore characterized by low cost and low loss.

By including the boost converter circuit 220, the power supply apparatus 200c can output a predetermined DC voltage. The power supply apparatus 200c can also reduce harmonics.

(Power Supply Apparatus of Present Disclosure)

Figure 4:
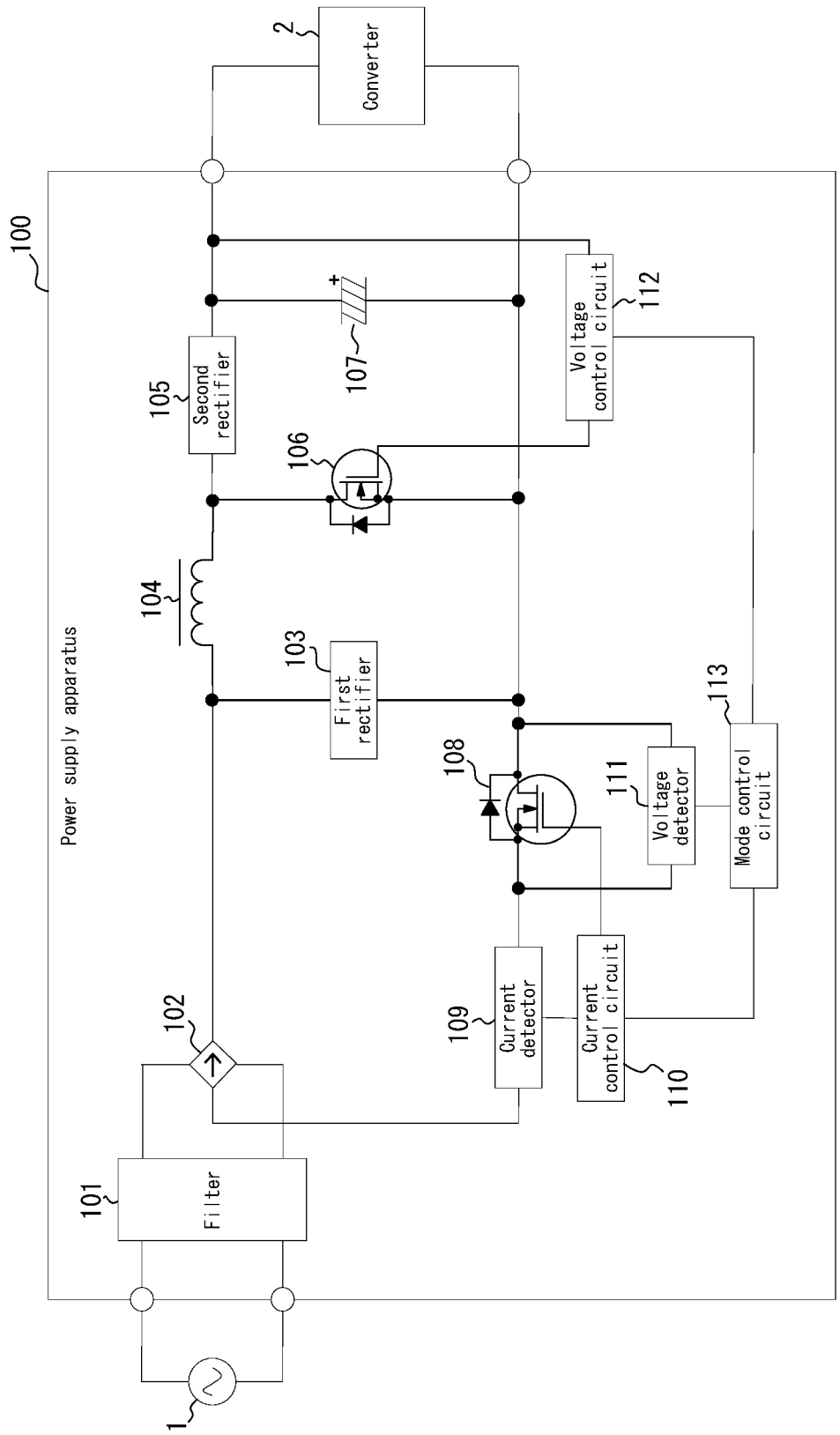
FIG. 4 is a diagram illustrating a schematic configuration of a power supply apparatus according to an embodiment.

FIG. 4 is a diagram illustrating a schematic configuration of a power supply apparatus 100 according to an embodiment. Referring to FIG. 1, the configuration and functions of the power supply apparatus 100 according to an embodiment are described.

The power supply apparatus 100 converts the input voltage supplied from an AC power source 1 into a predetermined DC voltage and outputs the DC voltage to a converter 2.

The converter 2 may, for example, be a DC-DC converter. In a case in which the converter 2 is a DC-DC converter, the converter 2 may be an isolated DC-DC converter.

The predetermined DC voltage outputted by the power supply apparatus 100 is a DC voltage suitable for operation of the converter 2. In this way, when the power supply apparatus 100 outputs a DC voltage suitable for the operation of the converter 2 and supplies the DC voltage to the converter 2, the converter 2 can operate under optimal conditions.

The power supply apparatus 100 includes a filter 101, a rectifier 102, a first rectifier 103, a choke coil 104, a second rectifier 105, a second FET 106, a smoothing capacitor 107, a first FET 108, a current detector 109, a current control circuit 110, a voltage detector 111, a voltage control circuit 112, and a mode control circuit 113.

The filter 101 removes voltage of an unwanted frequency component included in the input voltage from the AC power source 1. The filter 101 may, for example, be a low-pass filter or a band-bus filter.

The rectifier 102 is a circuit that allows current to flow in only one direction. The input portion of the rectifier 102 is connected to the filter 101. One of the output portions of the rectifier 102 is connected to one end of the first rectifier 103 and one end of the choke coil 104. The other output portion of the rectifier 102 is connected to the current detector 109.

The power supply apparatus 100 includes a circuit corresponding to the inrush current prevention circuit based on the buck converter system as described with reference to FIG. 1 and a circuit corresponding to the boost converter circuit described with reference to FIG. 2.

Figure 5:
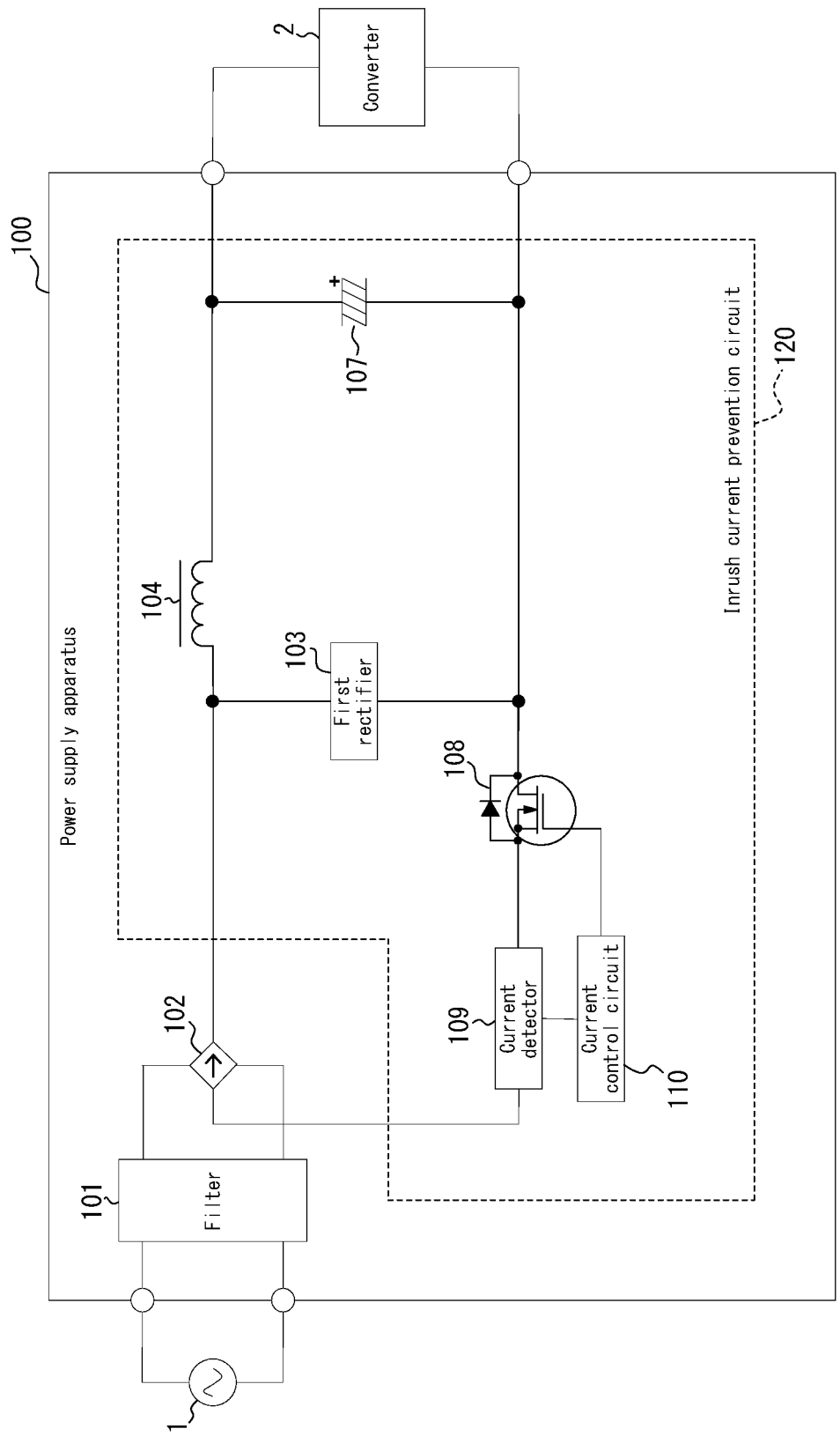
FIG. 5 is a diagram illustrating the portion of the power supply apparatus in FIG. 4 that forms an inrush current prevention circuit.

First, the inclusion of the inrush current prevention circuit based on the buck converter system in the power supply apparatus 100 illustrated in FIG. 4 is described with reference to FIG. 5. FIG. 5 is a diagram in which the circuit elements related to the inrush current prevention circuit are extracted from the power supply apparatus 100 illustrated in FIG. 4.

Referring to FIG. 5, the first rectifier 103, the choke coil 104, the smoothing capacitor 107, the first FET 108, the current detector 109, and the current control circuit 110 included in the power supply apparatus 100 form an inrush current prevention circuit 120.

Comparing the inrush current prevention circuit 120 illustrated in FIG. with the inrush current prevention circuit 210 illustrated in FIG. 1, the first rectifier 103, the choke coil 104, the smoothing capacitor 107, the first FET 108, the current detector 109, and the current control circuit 110 of the inrush current prevention circuit 120 illustrated in FIG. 5 respectively correspond to the diode 212, the choke coil 211, the smoothing capacitor 213, the FET 214, the current detector 215, and the current control circuit 216 of the inrush current prevention circuit 210 illustrated in FIG. 1.

Figure 6:
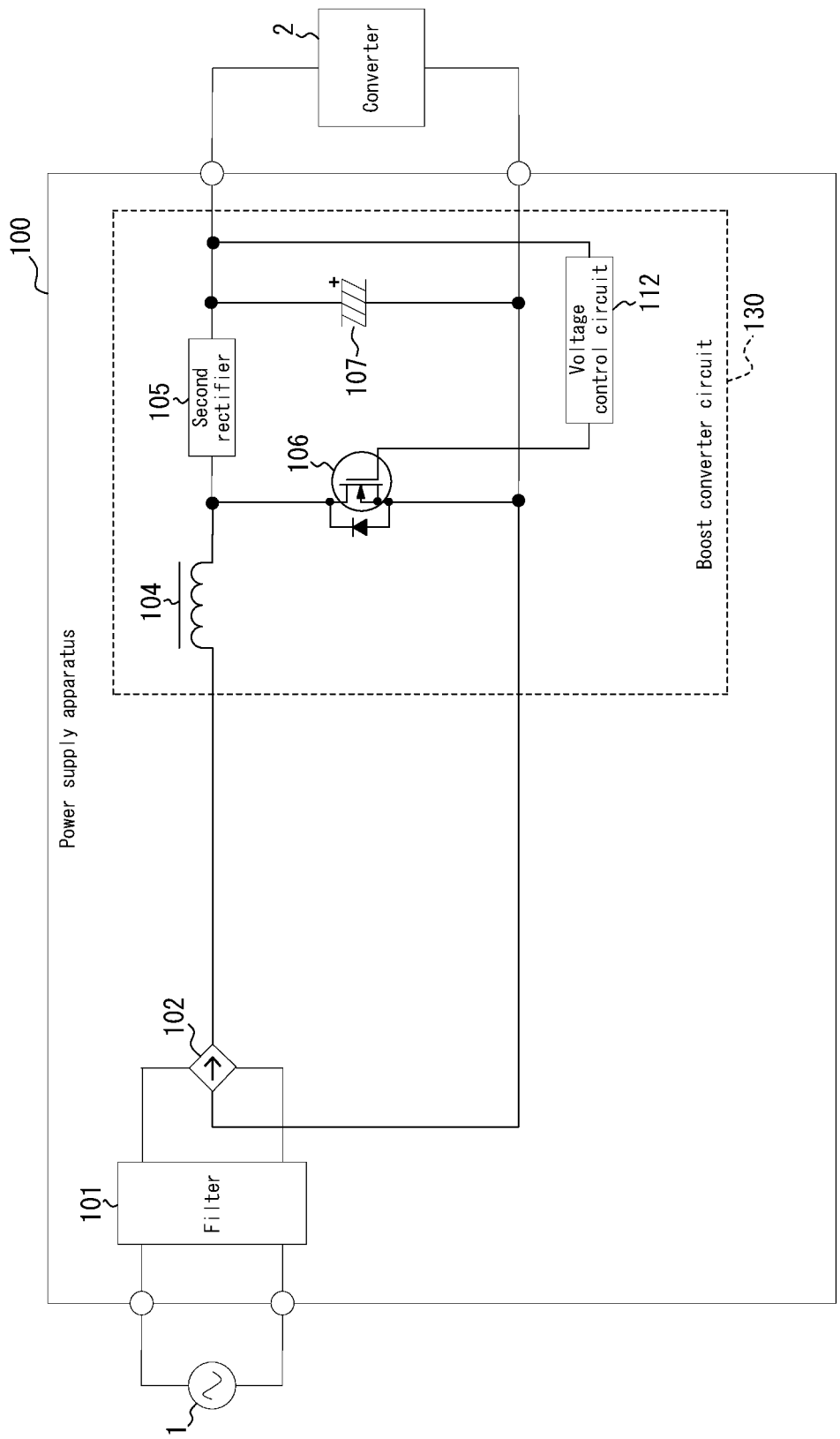
FIG. 6 is a diagram illustrating the portion of the power supply apparatus in FIG. 4 that forms a boost converter circuit.

Next, the inclusion of the boost converter circuit in the power supply apparatus 100 illustrated in FIG. 4 is described with reference to FIG. 6. FIG. 6 is a diagram in which the circuit elements related to the boost converter circuit are extracted from the power supply apparatus 100 illustrated in FIG. 4.

Referring to FIG. 6, the choke coil 104, the second rectifier 105, the second FET 106, the smoothing capacitor 107, and the voltage control circuit 112 included in the power supply apparatus 100 form a boost converter circuit 130.

Comparing the boost converter circuit 130 illustrated in FIG. 6 with the boost converter circuit 220 illustrated in FIG. 2, the choke coil 104, the second rectifier 105, the second FET 106, the smoothing capacitor 107, and the voltage control circuit 112 of the boost converter circuit 130 illustrated in FIG. 6 respectively correspond to the choke coil 221, the diode 222, the FET 223, the smoothing capacitor 224, and the voltage control circuit 225 of the boost converter circuit 220 illustrated in FIG. 2.

As described in FIGS. 5 and 6, the power supply apparatus 100 includes the inrush current prevention circuit 120 based on the buck converter system and the boost converter circuit 130. Here, the choke coil 104 included in the inrush current prevention circuit 120 illustrated in FIG. 5 and the choke coil 104 included in the boost converter circuit 130 illustrated in FIG. 6 are a common choke coil. The smoothing capacitor 107 included in the inrush current prevention circuit 120 illustrated in FIG. 5 and the smoothing capacitor 107 included in the boost converter circuit 130 illustrated in FIG. 6 are a common smoothing capacitor. Therefore, when comparing the power supply apparatus 100 according to an embodiment with the power supply apparatus 200c according to the comparative example illustrated in FIG. 3, the power supply apparatus 100 according to an embodiment has one less choke coil and one less smoothing capacitor than the power supply apparatus 200c according to the comparative example. In other words, the power supply apparatus 100 according to an embodiment achieves a configuration that includes both the inrush current prevention circuit 120 based on the buck converter system and the boost converter circuit 130 while having fewer circuit elements than the power supply 200c according to the comparative example.

The explanation now returns to FIG. 4.

The first rectifier 103 is a circuit that allows current to flow in only one direction. The first rectifier 103 may, for example, be a diode, a FET, or the like. The first rectifier 103 allows current to flow in the direction from bottom to top in FIG. 4.

One end of the first rectifier 103 is connected to the output portion of the rectifier 102 and one end of the choke coil 104. The other end of the first rectifier 103 is connected to the source of the second FET 106, the negative electrode of the smoothing capacitor 107, and the drain of the first FET 108.

The choke coil 104 may be any appropriate coil. One end of the choke coil 104 is connected to the output portion of the rectifier 102 and one end of the first rectifier 103. The other end of the choke coil 104 is connected to one end of the second rectifier 105 and the drain of the second FET 106.

The second rectifier 105 is a circuit that allows current to flow in only one direction. The second rectifier 105 may, for example, be a diode, a FET, or the like. The second rectifier 105 allows current to flow in the direction from left to right in FIG. 4.

One end of the second rectifier 105 is connected to the other end of the choke coil 104 and the drain of the second FET 106. The other end of the second rectifier 105 is connected to the positive electrode of the smoothing capacitor 107.

The second FET 106 may be any appropriate FET. The drain of the second FET 106 is connected to the other end of the choke coil 104 and one end of the second rectifier 105. The source of the second FET 106 is connected to the other end of the first rectifier 103, the negative electrode of the smoothing capacitor 107, and the drain of the first FET 108. The gate of the second FET 106 is connected to the voltage control circuit 112.

The smoothing capacitor 107 has the function of reducing ripple components. The smoothing capacitor 107 may be any appropriate capacitor. The positive electrode of the smoothing capacitor 107 is connected to the other end of the second rectifier 105. The negative electrode of the smoothing capacitor 107 is connected to the other end of the first rectifier 103, the source of the second FET 106, and the drain of the first FET 108.

The first FET 108 may be any appropriate FET. The drain of the first FET 108 is connected to the other end of the first rectifier 103, the source of the second FET 106, and the negative electrode of the smoothing capacitor 107. The source of the first FET 108 is connected to the current detector 109. The gate of the first FET 108 is connected to the current control circuit 110.

The first FET 108 has the function of switching between applying and not applying current from the AC power source 1 to the inrush current prevention circuit 120. When the first FET 108 is on, current flows from the AC power source 1 through the inrush current prevention circuit 120. When the first FET 108 is off, current does not flow from the AC power source 1 through the inrush current prevention circuit 120.

The current detector 109 detects the value of current flowing in the first FET 108. The current detector 109 may, for example, be a resistor. The current detector 109 outputs the detected value of current to the current control circuit 110.

The current control circuit 110 turns off the first FET 108 when the value of current acquired from the current detector 109 reaches a predetermined value of current or higher. The current control circuit 110 turns on the first FET 108 when the value of current acquired from the current detector 109 falls below a predetermined value of current. At this time, to prevent the first FET 108 from switching on and off frequently, the threshold for turning on the first FET 108 and the threshold for turning off the first FET 108 may be different thresholds.

The control by which the current control circuit 110 turns on the first FET 108 is not limited to the above-described control. For example, the current control circuit 110 may turn on the first FET 108 upon the elapse of a predetermined length of time after turning the first FET 108 off. The predetermined length of time may, for example, be several tens of μs.

The voltage detector 111 detects the voltage value between the drain and the source of the first FET 108.

The voltage control circuit 112 detects the voltage value of the smoothing capacitor 107 and controls the duty ratio at which the second FET 106 turns on and off so that the detected voltage value approaches a predetermined DC voltage. The predetermined DC voltage is a DC voltage suitable for operation of the converter 2. In other words, the voltage control circuit 112 controls the duty ratio at which the second FET 106 turns on and off so that a DC voltage suitable for operation of the converter 2 is outputted to the converter 2.

In a case in which the voltage value of the smoothing capacitor 107 is smaller than the predetermined DC voltage, the voltage control circuit 112 controls the duty ratio at which the second FET 106 turns on and off so that the second FET 106 is on for a longer period of time. In a case in which the voltage value of the smoothing capacitor 107 is larger than the predetermined DC voltage, the voltage control circuit 112 controls the duty ratio at which the second FET 106 turns on and off so that the second FET 106 is on for a shorter period of time.

The mode control circuit 113 switches between a first mode and a second mode.

The first mode is a mode in which the inrush current prevention circuit 120, included in the power supply apparatus 100, illustrated in FIG. 5 performs an inrush current prevention operation, and the boost converter circuit 130, included in the power supply apparatus 100, illustrated in FIG. 6 does not perform a boost converter operation. The operations of the power supply apparatus 100 in the first mode are described below.

The second mode is a mode in which the inrush current prevention circuit 120, included in the power supply apparatus 100, illustrated in FIG. 5 does not perform an inrush current prevention operation, and the boost converter circuit 130, included in the power supply apparatus 100, illustrated in FIG. 6 performs a boost converter operation. The operations of the power supply apparatus 100 in the second mode are described below.

The mode control circuit 113 operates the power supply apparatus 100 in the first mode when the power is turned on. During operation in the first mode, the mode control circuit 113 causes the current control circuit 110 to operate normally. That is, the current control circuit 110 turns off the first FET 108 when the value of current acquired from the current detector 109 reaches a predetermined value of current or higher. The current control circuit 110 turns on the first FET 108 when the value of current acquired from the current detector 109 falls below a predetermined value of current. As a result, the inrush current prevention circuit 120 included in the power supply apparatus 100 performs an inrush current prevention operation.

During operation in the first mode, the mode control circuit 113 controls the voltage control circuit 112 and causes the second FET 106 to be always off. As a result, the boost converter circuit 130 included in the power supply apparatus 100 does not perform a boost converter operation.

The mode control circuit 113 switches from the first mode to the second mode when the voltage value between the drain and the source of the first FET 108 detected by the voltage detector 111 falls to a predetermined threshold or less.

The mode control circuit 113 may, for example, calculate the average voltage value between the drain and the source of the first FET 108 over a predetermined period of time and switch from the first mode to the second mode when the calculated average voltage value between the drain and the source of the first FET 108 falls to a predetermined threshold or less. In the first mode, as the charge of the smoothing capacitor 107 accumulates, the current flowing through the first FET 108 becomes smaller, and the first FET 108 thus turns off less frequently. Therefore, the average voltage value between the drain and the source of the first FET 108 gradually becomes smaller. The mode control circuit 113 switches from the first mode to the second mode when the calculated average falls to a predetermined threshold or less.

During operation in the second mode, the mode control circuit 113 controls the current control circuit 110 and causes the first FET 108 to be always on. As a result, the inrush current prevention circuit 120 included in the power supply apparatus 100 does not perform an inrush current prevention operation.

Furthermore, during operation in the second mode, the mode control circuit 113 causes the voltage control circuit 112 to operate normally. That is, the voltage control circuit 112 detects the voltage value of the smoothing capacitor 107 and controls the duty ratio at which the second FET 106 turns on and off so that the detected voltage value approaches a predetermined DC voltage. As a result, the boost converter circuit 130 included in the power supply apparatus 100 performs a boost converter operation.

Figure 7:
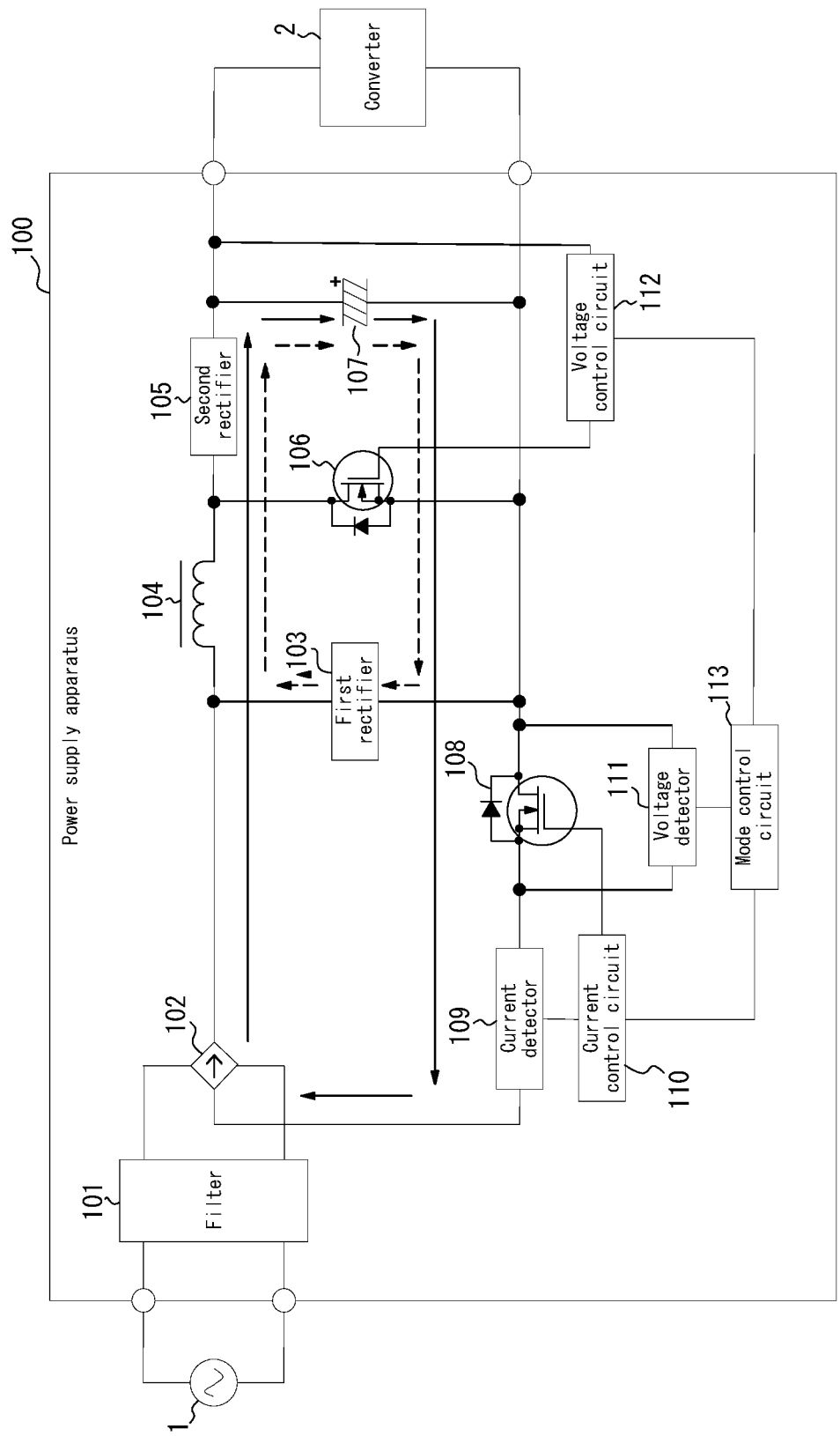
FIG. 7 is a diagram illustrating operations when the power supply apparatus according to an embodiment operates in a first mode.

The operations of the power supply apparatus 100 when operating in the first mode are described with reference to FIG. 7.

During operation in the first mode, the mode control circuit 113 controls the voltage control circuit 112 and causes the second FET 106 to be always off.

When voltage is applied from the AC power source 1, the first FET 108 is controlled to turn on. When voltage is applied from the AC power source 1, current flows through the power supply apparatus 100 as indicated by the solid arrows. That is, current flows through the choke coil 104, the second rectifier 105, the smoothing capacitor 107, the first FET 108, and the current detector 109 in this order. The smoothing capacitor 107 is charged by the current flowing in this way.

The current detector 109 detects the value of current flowing in the first FET 108. The current detector 109 outputs the detected value of current to the current control circuit 110.

The current control circuit 110 turns off the first FET 108 when the value of current acquired from the current detector 109 reaches a predetermined value of current or higher.

When the first FET 108 turns off, the magnetic energy accumulated in the choke coil 104 is released, and current flows as indicated by the dashed arrows. That is, current flows through the choke coil 104, the second rectifier 105, the smoothing capacitor 107, and the first rectifier 103 in this order. The smoothing capacitor 107 is charged by the current flowing in this way.

Subsequently, the current control circuit 110 turns on the first FET 108 when the value of current acquired from the current detector 109 falls below a predetermined value of current.

By thus repeatedly turning the first FET 108 on and off, the power supply apparatus 100 can charge the smoothing capacitor 107 while suppressing inrush current.

As the charging voltage of the smoothing capacitor 107 increases, the current flowing through the smoothing capacitor 107 becomes smaller. As a result, the voltage between the drain and the source of the first FET 108 becomes smaller. The mode control circuit 113 switches from the first mode to the second mode when the voltage value between the drain and the source of the first FET 108 detected by the voltage detector 111 falls to a predetermined threshold or less.

Figure 8:
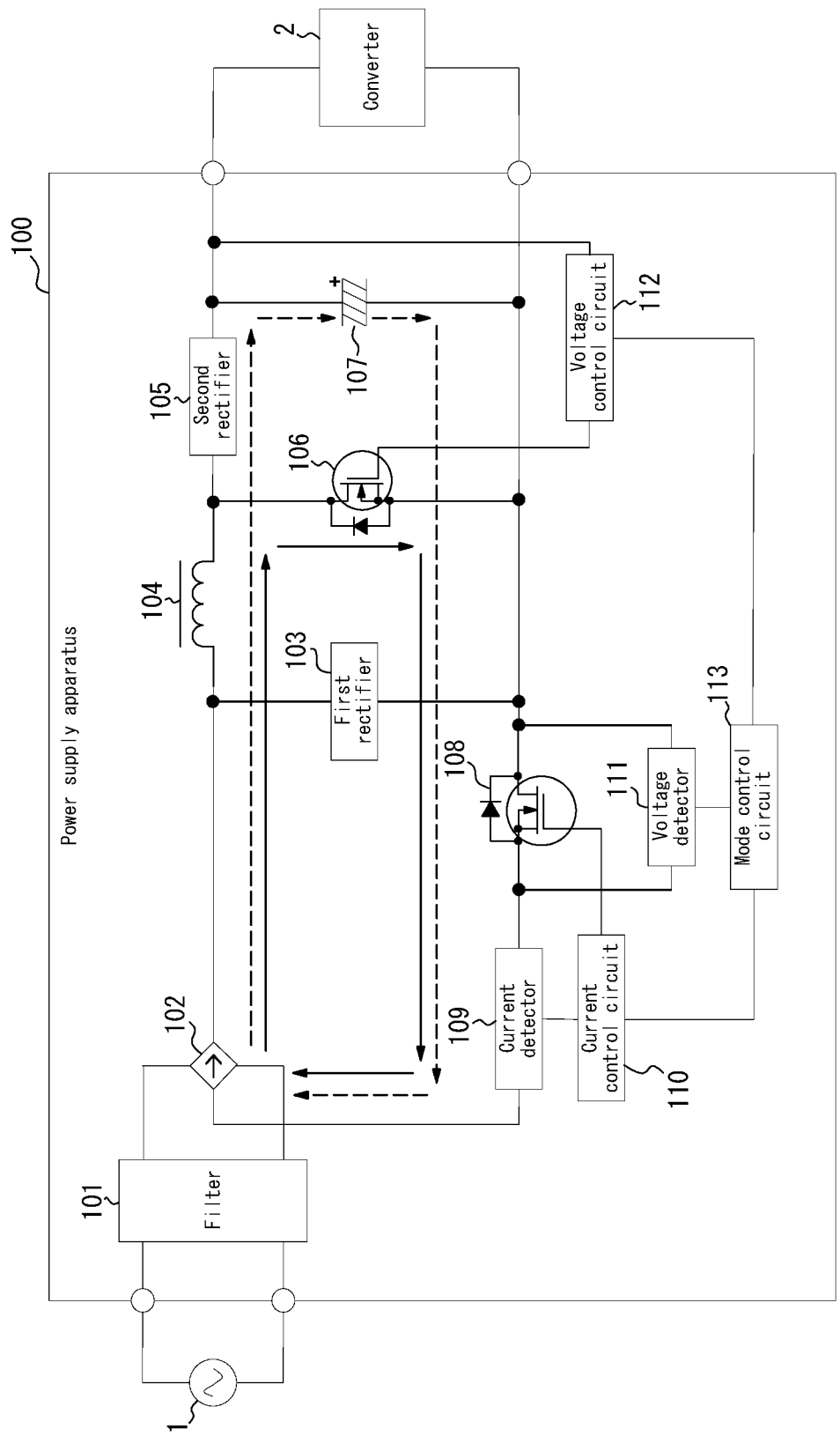
FIG. 8 is a diagram illustrating operations when the power supply apparatus according to an embodiment operates in a second mode.

The operations of the power supply apparatus 100 when operating in the second mode are described with reference to FIG. 8.

During operation in the second mode, the mode control circuit 113 controls the current control circuit 110 and causes the first FET 108 to be always on.

When the second FET 106 is on, current flows through the power supply apparatus 100 as indicated by the solid arrows. That is, current flows through the choke coil 104, the second FET 106, the first FET 108, and the current detector 109 in this order. At this time, magnetic energy accumulates in the choke coil 104.

Upon the second FET 106 turning off, the voltage direction is reversed in the choke coil 104, the magnetic energy accumulated in the choke coil 104 is released, and current flows as indicated by the dashed arrows. That is, current flows through the choke coil 104, the second rectifier 105, the smoothing capacitor 107, the first FET 108, and the current detector 109 in this order. By these operations, the power supply apparatus 100 performs a boost operation.

The voltage control circuit 112 detects the voltage value of the smoothing capacitor 107 and controls the duty ratio at which the second FET 106 turns on and off so that the detected voltage value approaches a predetermined DC voltage.

The power supply apparatus 100 thus provides a predetermined DC voltage adjusted by the voltage control circuit 112 to the converter 2.

According to the power supply apparatus 100 of the embodiment described above, the cost of circuit elements can be reduced while including an inrush current prevention circuit and a boost converter circuit. More specifically, the power supply apparatus 100 includes the inrush current prevention circuit 120 and the boost converter circuit 130, and the choke coil 104 included in the inrush current prevention circuit 120 and the choke coil 104 included in the boost converter circuit 130 are a common choke coil. Furthermore, the smoothing capacitor 107 included in the inrush current prevention circuit 120 and the smoothing capacitor 107 included in the boost converter circuit 130 are a common smoothing capacitor. Therefore, as compared to the configuration of the power supply apparatus 200c according to the comparative example illustrated in FIG. 3, the power supply apparatus 100 according to an embodiment can reduce the number of choke coils and smoothing capacitors by one each, thereby reducing the cost of the circuit elements.

(First Variation)

Figure 9:
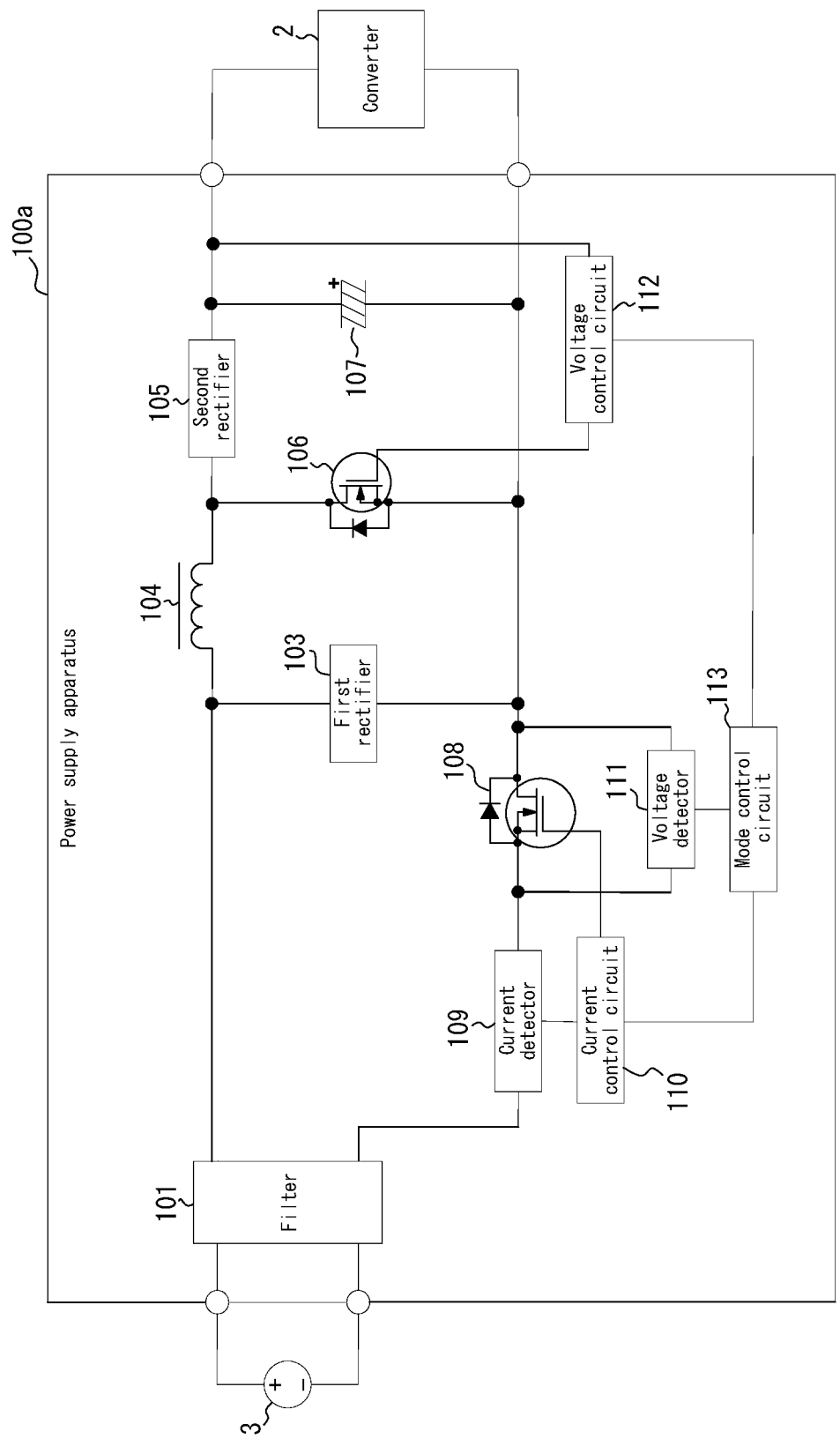
FIG. 9 is a diagram illustrating a schematic configuration of a power supply apparatus according to a first variation.

FIG. 9 is a diagram illustrating a schematic configuration of a power supply apparatus 100c according to a first variation. The power supply apparatus 100 illustrated in FIG. 4 is configured to be supplied with voltage from the AC power source 1, whereas the power supply apparatus 100a according to the first variation is configured to be supplied with voltage from a DC power supply 3.

The power supply apparatus 100a according to the first variation differs from the power supply apparatus 100 illustrated in FIG. 4 by not including the rectifier 102.

Even in a configuration in which voltage is supplied from the DC power supply 3, as in the power supply apparatus 100a according to the first variation, the same functions as those of the power supply apparatus 100 illustrated in FIG. 4 can be achieved.

(Second Variation)

Figure 10:
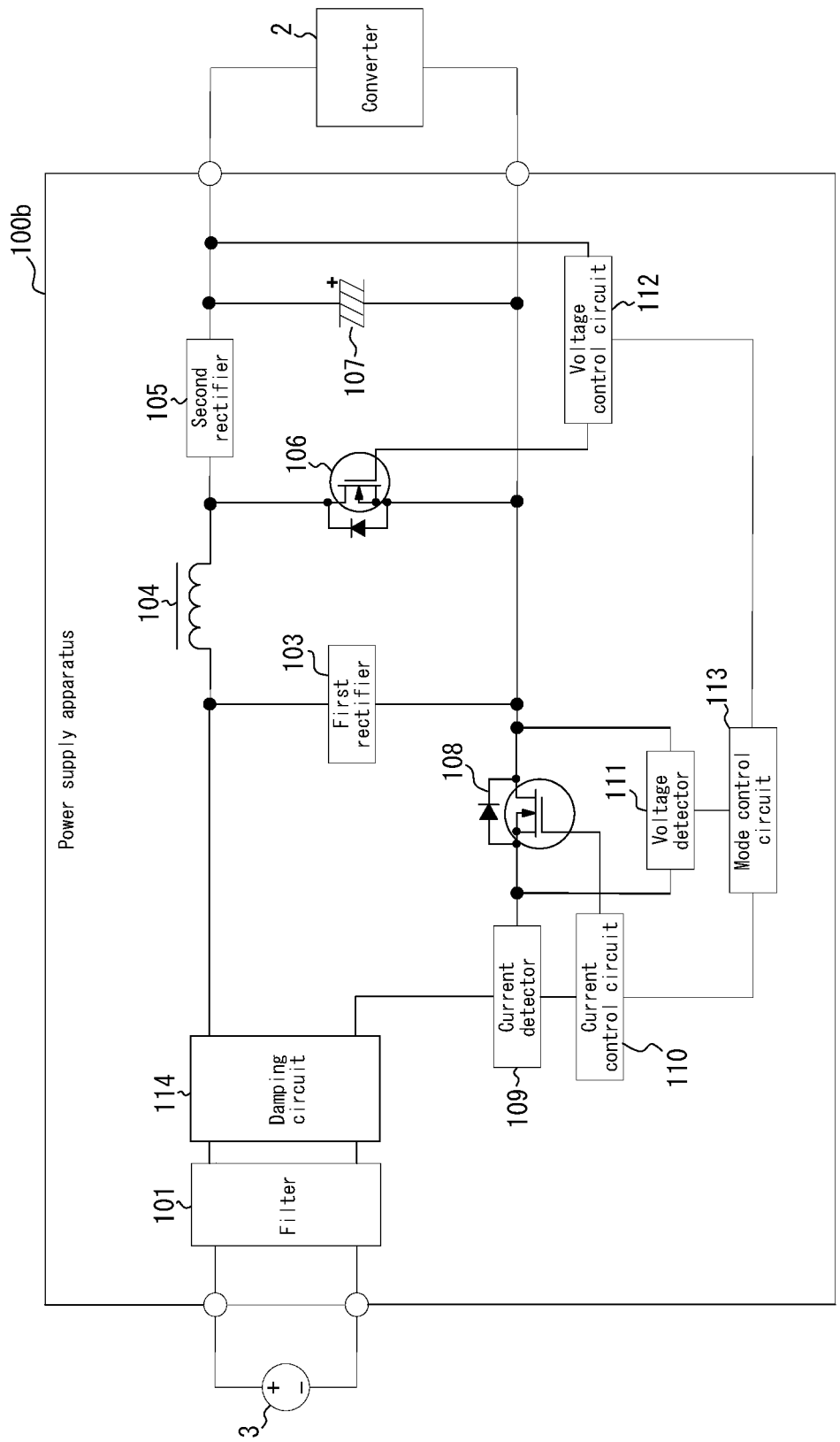
FIG. 10 is a diagram illustrating a schematic configuration of a power supply apparatus according to a second variation.

FIG. 10 is a diagram illustrating a schematic configuration of a power supply apparatus 100b according to a second variation.

The power supply apparatus 100b according to the second variation differs from the power supply apparatus 100a illustrated in FIG. 9 by the inclusion of a damping circuit 114 downstream from the filter 101, i.e., upstream from the inrush current prevention circuit 120.

For example, in the power supply apparatus 100a illustrated in FIG. 9, in special cases such as a case in which a cable connected to the input portion is long, or a case in which the filter 101 has a very large inductance component, LC resonance may occur, and the operation of the power supply apparatus 100a may become unstable.

In such cases, the power supply apparatus 100b according to the second variation can suppress LC resonance, since the damping circuit 114 can reduce the AC impedance of the input portion. Therefore, the power supply apparatus 100b according to the second variation can prevent operation of the power supply apparatus 100b from becoming unstable due to the occurrence of LC resonance.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are included therein.

For example, the arrangement, number, and the like of the above-described components are not limited to the above explanation or the drawings. The arrangement, number, and the like of each component may be selected freely as long as the functions of the component can be achieved.

The invention claimed is:

1. A power supply apparatus for converting an input voltage supplied from a power source to a predetermined direct current voltage, the power supply apparatus comprising: an inrush current prevention circuit based on a buck converter system and configured to suppress a flow of inrush current from the power source to the power supply apparatus; a boost converter circuit configured to output the predetermined direct current voltage; and a mode control circuit configured to switch between a first mode and a second mode, wherein a choke coil included in the inrush current prevention circuit and a choke coil included in the boost converter circuit are a common choke coil, a smoothing capacitor included in the inrush current prevention circuit and a smoothing capacitor included in the boost converter circuit are a common smoothing capacitor, the first mode is a mode in which the inrush current prevention circuit performs an inrush current prevention operation and the boost converter circuit does not perform a boost converter operation, the second mode is a mode in which the inrush current prevention circuit does not perform the inrush current prevention operation and the boost converter circuit performs the boost converter operation, the inrush current prevention circuit further comprises a first FET capable of switching between applying and not applying current from the power source to the inrush current prevention circuit, the power supply apparatus further comprises a voltage detector capable of detecting a voltage value between a drain and a source of the first FET, and the mode control circuit is configured to switch from the first mode to the second mode when an average value of the voltage value between the drain and the source of the first FET detected by the voltage detector falls to a predetermined threshold or less; and further comprising a current control circuit capable of repeatedly turning on and off the first FET in the first mode such that the first FET turns off less frequently as the smoothing capacitor is charged, wherein the mode control circuit is configured to calculates the average voltage value over a predetermined period of time in which the first FET is turned on multiple times and the first FET is turned off multiple times.

2. The power supply apparatus according to claim 1, wherein
the boost converter circuit further comprises a second FET capable of adjusting an output voltage of the boost converter circuit by an on/off duty ratio, and
the mode control circuit is configured to
control the second FET to be always off in the first mode, and
control the first FET to be always on in the second mode.

3. The power supply apparatus according to claim 1, further comprising a damping circuit upstream from the inrush current prevention circuit.

* * * * *